(12) United States Patent
Accapadi et al.

(10) Patent No.: US 10,169,087 B2
(45) Date of Patent: Jan. 1, 2019

(54) TECHNIQUE FOR PRESERVING MEMORY AFFINITY IN A NON-UNIFORM MEMORY ACCESS DATA PROCESSING SYSTEM

(75) Inventors: Mathew Accapadi, Cedar Park, TX (US); Robert H. Bell, Jr., Austin, TX (US); Men-Chow Chiang, Austin, TX (US); Hong L. Hua, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1545 days.

(21) Appl. No.: 13/015,733

(22) Filed: Jan. 28, 2011

(65) Prior Publication Data

US 2012/0198187 A1    Aug. 2, 2012

(51) Int. Cl.
*G06F 15/16*       (2006.01)
*G06F 9/50*        (2006.01)

(52) U.S. Cl.
CPC .......... *G06F 9/5016* (2013.01); *G06F 9/5088* (2013.01); *G06F 2212/2542* (2013.01); *Y02D 10/22* (2018.01); *Y02D 10/32* (2018.01)

(58) Field of Classification Search
USPC .................................. 711/160, 141
See application file for complete search history.

(56) References Cited

U.S. PATENT DOCUMENTS

| | | | |
|---|---|---|---|
| 6,453,408 B1 * | 9/2002 | Fiske et al. | 712/29 |
| 6,804,729 B2 * | 10/2004 | Swanberg | 710/22 |
| 7,673,114 B2 | 3/2010 | Allen | |
| 2008/0163203 A1 | 7/2008 | Anand | |
| 2009/0089531 A1 * | 4/2009 | Johnson et al. | 711/170 |
| 2009/0307439 A1 | 12/2009 | Jacobs | |
| 2011/0202735 A1 * | 8/2011 | Kono et al. | 711/162 |
| 2011/0231605 A1 * | 9/2011 | Ogawa et al. | 711/114 |
| 2011/0271071 A1 * | 11/2011 | Nakatogawa | 711/165 |
| 2012/0017042 A1 * | 1/2012 | Matsui et al. | 711/114 |

* cited by examiner

*Primary Examiner* — Ryan Bertram
*Assistant Examiner* — Trang K Ta
(74) *Attorney, Agent, or Firm* — Antony P. Ng; Steven L. Bennett

(57) ABSTRACT

Techniques for preserving memory affinity in a computer system is disclosed. In response to a request for memory access to a page within a memory affinity domain, a determination is made if the request is initiated by a processor associated with the memory affinity domain. If the request is not initiated by a processor associated with the memory affinity domain, a determination is made if there is a page ID match with an entry within a page migration tracking module associated with the memory affinity domain. If there is no page ID match, an entry is selected within the page migration tracking module to be updated with a new page ID and a new memory affinity ID. If there is a page ID match, then another determination is made whether or not there is a memory affinity ID match with the entry with the page ID field match. If there is no memory affinity ID match, the entry is updated with a new memory affinity ID; and if there is a memory affinity ID match, an access counter of the entry is incremented.

6 Claims, 3 Drawing Sheets

TECHNIQUE FOR PRESERVING MEMORY AFFINITY IN A NON-UNIFORM MEMORY ACCESS DATA PROCESSING SYSTEM

BACKGROUND OF THE INVENTION

1. Technical Field

The present disclosure relates to non-uniform memory access data processing systems in general, and in particular to a method for preserving memory affinity in a non-uniform memory access data processing system.

2. Description of Related Art

Generally speaking, the performance of a computer system largely depends on the execution speed of system and application programs. During program execution, both instructions and data need to be fetched from a system memory. While the frequency of memory access has been greatly reduced via the utilization of a cache hierarchy, system memory accesses after cache misses still account for a significant portion of program execution time.

The disparity between program execution time and memory access time continues to increase even with various improvements in computer hardware technology. In fact, while program execution time decreases when processor frequency increases, as expected, the number of processor cycles needed to retrieve data from a system memory effectively increases. For example, when the clock frequency of a processor is doubled, the execution time of an integer instruction is likely to be reduced by half, but the number of processor clocks for accessing a memory may actually be doubled. In addition, memory speed has not been keeping up with the processor clock speed. For example, processor clock speed had increased about 60% to 100% from one processor generation to another while memory speed had increased only 25% within the same time frame.

One way to shorten memory access time is to place a system memory as close to processors as possible physically. But in a large server system, it is difficult to position the system memory in the ideal proximity to processors under the form factor of the server system, which leads to varying latencies to access different regions of the system memory. Thus, large server systems tend to use a distributed memory model known as non-uniform memory access (NUMA). One challenge for a NUMA computer system is to maintain high memory affinity to various processors where threads/processes are being executed. High memory affinity implies that blocks or pages of the system memory that are used local to a processor are positioned in a memory region close to the processor.

Currently, an operating system can start a program with a high memory affinity by allocating newly accessed pages in a local memory affinity domain, i.e., in a local memory or a memory having minimal latency. This strategy, however, cannot cope with changes in memory affinity stemmed from certain operations initiated by the operating system.

For example, for load balancing purposes, processes may have to be migrated from heavily utilized processors to less utilized ones. Also, in order to decrease power consumption, processor folding operations can be utilized to force process migration for freeing and powering down some processors when the system load decreases. Process migration can also occur when system load increases, which may result in processor unfolding to spread out the increased workload to more processors. All these dynamically occurring process migration can cause a loss in memory affinity, which can lead to various degrees of performance degradation due to an increase in remote memory accesses.

One prior art solution for preserving memory affinity is by banning process migration completely. This strategy can certainly reduce the likelihood of losing memory affinity, but at the expense of forgoing the flexibility of the system to perform proper load balancing and/or processor folding. Importantly, even with this drastic measure, a system still may not be able to cope with a shift of memory affinity due to dynamically changing access patterns. This can happen, for example, when a page is shared by processors from multiple affinity domains, and at different computational phases a different processor becomes the dominant source of access to the page.

Another prior art solution is to migrate pages along with a process migration. This solution triggers the problem of not knowing which pages to migrate with the job and sometimes wrong pages may be migrated, which will actually reduce memory affinity system-wide. This problem is particularly bad for pages that are shared among processes migrating to different computing resources.

Consequently, it would be desirable to provide an improved method for preserving memory affinity in a NUMA computer system.

SUMMARY OF THE INVENTION

In accordance with a preferred embodiment of the present disclosure, in response to a request for memory access to a page within a memory affinity domain, a determination is made whether or not the request is initiated by a processor associated with the memory affinity domain. If the request is not initiated by a processor associated with the memory affinity domain, a determination is made whether or not there is a page ID match with an entry within a page migration tracking module associated with the memory affinity domain. If there is no page ID match with any entry within the page migration tracking module, an entry is selected within the page migration tracking module to be updated with a new page ID and a new memory affinity ID. If there is a page ID match with an entry within the page migration tracking module, then another determination is made whether or not there is a memory affinity ID match with the entry with the page ID field match. If there is no memory affinity ID match, the entry with the page ID field match is updated with a new memory affinity ID. If there is a memory affinity ID match, an access counter of the entry with the page ID field match is incremented.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
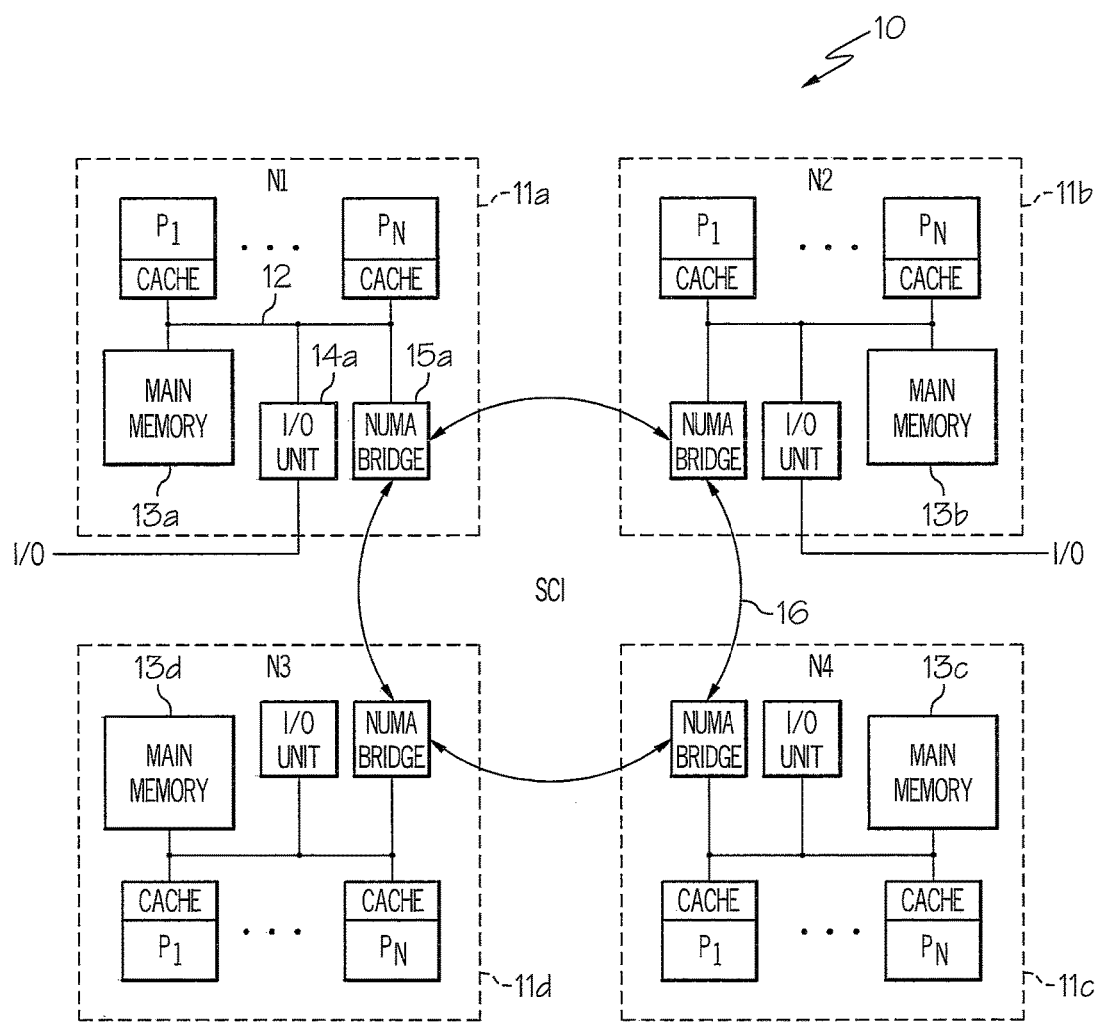
FIG. 1 is a block diagram of a shared-memory multiprocessor system, in which an embodiment of the present invention may be implemented.

Referring now to the drawings and in particular to FIG. 1, there is depicted a block diagram of a shared-memory multiprocessor system having a non-uniform memory access (NUMA) architecture, in which a preferred embodiment of the present invention may be implemented. As shown, a NUMA multiprocessor system 10 includes a node 11a, a node lib, a node 11c, and a node 11d. Each of nodes 11a-11d has at least one processor connected to a local memory within the node via an intra-node connection mechanisms such as a special bus or a crossbar switch. For example, multi-processor node 11a contains processors $P_1$-$P_N$ along with their respective cache memory connected to a main memory 13a that is local to processors $P_1$-$P_N$ via an intra-node bus 12. Each of nodes 11a-11d also contain an input/output (I/O) unit, such as I/O unit 14a within node 11a, for supporting connections to various peripherals such as printers, communication links, direct access storage devices, etc.

All nodes 11a-11d are interconnected by a Scalable Coherent Interconnect (SCI) 16. SCI 16 is a high-bandwidth interconnection network capable of providing cache coherence throughout NUMA multiprocessor system 10. Each of nodes 11a-11d has a NUMA bridge, such as a NUMA bridge 15a in node 11a, to provide connections to SCI 16 in order to maintain inter-nodal connection among nodes 11a-11d.

All processors within NUMA multiprocessor system 10 share an identical addressable main memory, which is distributed among nodes 11a-11d as local main memories 13a-13d. Because all local main memories 13a-13d are accessible by all the processors within NUMA multiprocessor system 10, the total addressable main memory space within NUMA multiprocessor system 10 includes the combination of all local main memories 13a-13d. Each byte of system main memory can be addressable by a unique real address. The bus logic for each of nodes 11a-11d monitors all memory accesses by the processors and the I/O unit within a node and then directs each local memory access to the node's local main memory. Remote accesses to a non-local main memory are sent to SCI 16 via a NUMA bridge 15 within the requesting node.

Within the NUMA architecture, various multi-processor nodes can be grouped into different software partitions by an operating system via a process known as software partitioning, as it is well-known to those skilled in the relevant art.

As mentioned above, process migration can be utilized to perform load balancing and/or processor folding in order to control energy consumption of a NUMA computer system such as NUMA multiprocessor system 10 from FIG. 1. However, process migration may also contribute to loss of memory affinity that leads to system performance degradation. The present invention reduces or even eliminates memory affinity loss due to process migration by restoring the proper memory affinity via dynamic page migration.

In accordance with a preferred embodiment of the present invention, a page migration tracking module is utilized to manage process migration. The page migration tracking module keeps track of memory affinity access patterns to a physical memory.

Figure 2:
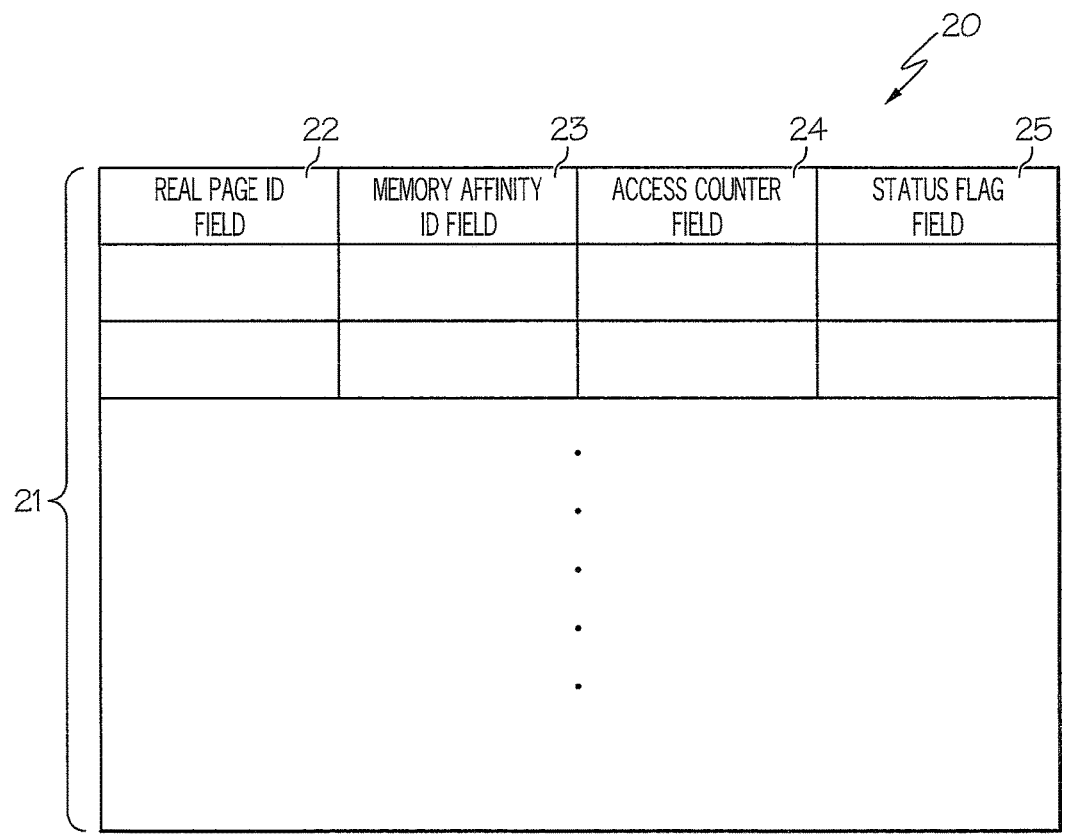
FIG. 2 is a block diagram of a page migration tracking module, in accordance with an embodiment of the present invention.

With reference now to FIG. 2, there is depicted a block diagram of page migration tracking module, in accordance with an embodiment of the present invention. As shown, a page migration tracking module 20 includes multiple entries 21. Each of entries 21 includes a real page identification (ID) field 22, a memory affinity ID field 23, an access counter field 24, and a status flag field 25. Memory affinity ID field 23 contains an ID of a remote access. Access counter field 24 tracks the number of memory accesses to an associated page. Status flag field 25 indicates whether an entry is valid (i.e., used or busy) or invalid (i.e., free). Entries 21 within page migration tracking module 20 can be organized in a direct-mapped or set-associative manner.

A memory affinity domain is defined as a group of memories that are in physical proximity, thus, any access to a memory within a memory affinity domain will experience identical memory access latency. Each memory affinity domain is preferably associated within a page migration tracking module, such as page migration tracking module 20. Every time a memory access is made to a memory affinity domain, the associated page migration tracking module is checked based on the real page ID of the memory access. If a page located within a first memory affinity domain is found to be requested by processors associated with a second memory affinity domain on a relatively regular basis, then that page is migrated from the first memory affinity domain to the second memory affinity domain.

In response to a memory access to a memory affinity domain by a processor, the real page ID and the memory affinity domain ID of the requesting processor are extracted from the address of the memory access. For NUMA multiprocessor system 10 from FIG. 1, each of nodes 11a-11d can be defined as one memory affinity domain, and each unique node ID can be utilized as a memory affinity domain ID accordingly.

Alternatively, in some computer systems, a processor has on-chip memory controllers for accessing its local memory, so a processor chip having an associated off-chip local memory can be defined as one memory affinity domain. Thus, each unique processor chip ID of a processor can be utilized as a memory affinity domain. Since the processor ID is readily available from the memory access itself, so it should be relatively straight-forward to deduce the corresponding processor chip ID.

Figure 3:
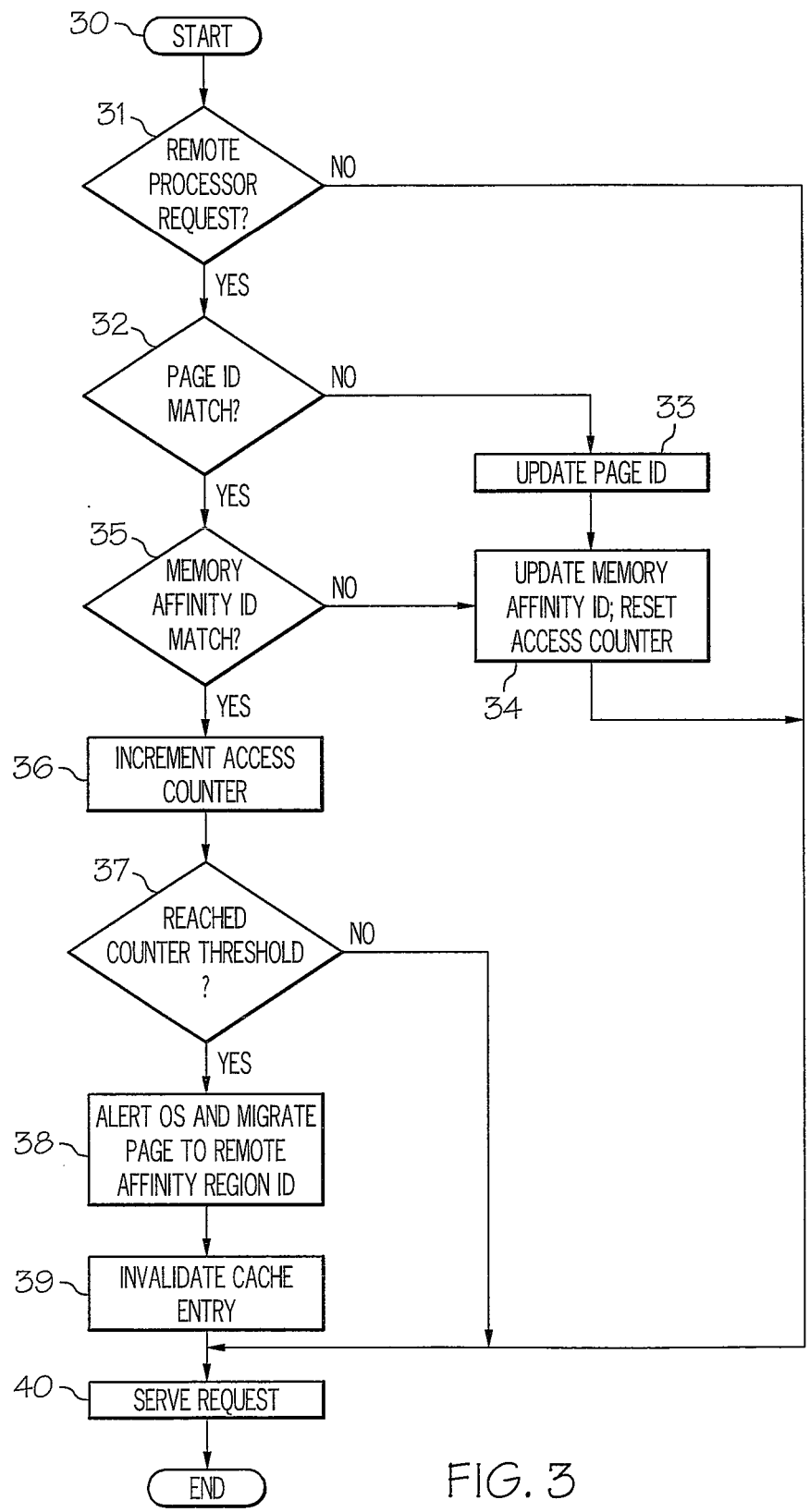
FIG. 3 is a high-level logic flow diagram of a method for preserving memory affinity in the shared-memory multiprocessor system from FIG. 1, in accordance with an embodiment of the present invention.

Referring now to FIG. 3, there is illustrated a high-level logic flow diagram of a method for preserving memory affinity in a NUMA data processing system, such as NUMA multiprocessor system 10 from FIG. 1, in accordance with an embodiment of the present invention. Starting at block 30, in response to a request for memory access to a page within a memory affinity domain, a determination is made as to whether or not the request is from a remote processor (i.e., a processor associated with a different memory affinity domain), as shown in FIG. 31. If the request is not from a remote processor, then the request will be served accordingly, as depicted in block 40.

Otherwise, if the request is from a remote processor, then a determination is made as to whether or not there is a real page ID match in a real page ID field (such as real page ID field 22 from FIG. 2) of a page migration tracking module associated with the memory affinity domain, as depicted in block 32. If there is no match in the real page ID field, then the real page ID field and a memory affinity field (such as memory affinity ID field 23 from FIG. 2) of the least-recently-used one of entries within the page migration tracking module will be replaced by a new real page ID and a new memory affinity ID, respectively, as shown in blocks 33-34. In addition, its access counter field (such as access counter field 24 from FIG. 2) will be reset to, for example, one, and the request will be served accordingly, as depicted in block 40.

However, if there is a match in the page ID field, then a determination is made as to whether or not there is a match in the memory affinity ID field of the same entry with the page ID field match, as shown in block 35. If there is no match in the memory affinity ID field of the same entry with the page ID field match, then the memory affinity ID field of the same entry with the page ID field match will be replaced by a new memory affinity ID, as depicted in block 34. In addition, its access counter field will be reset to, for example, one, and the request will be served accordingly, as depicted in block 40. If there is a match in the memory affinity ID field of the same entry with the page ID field match, then the access counter field of the same entry with the page ID field match will be incremented, as depicted in block 36.

Regarding the process migration mechanism, the operating system needs to be informed in order to process the page migration request. There are two possible embodiments, any one of which can generate a page migration. Preferably, upon an access counter reaching the predetermined threshold value, the hardware issues a hardware interrupt with the page ID of the page to migrate. The operating system then processes the hardware interrupt by migrating the page to the remote processor memory domain. Alternatively, a separate hardware queue can be implemented in hardware to buffer multiple real page IDs. The operating system either polls the queue on clock ticks or the hardware generated a hardware interrupt when there is at least one waiting request in the queue. For the present embodiment depicted in FIG. 3, the operating system is alerted that such page needs to be migrated to the remote processor and its memory affinity region, as depicted in block 38.

If the page migration request to operating system or to the queue is not accepted due to operating system busy or queue full, the hardware simply does nothing; when the next remote request comes in, the hardware will simply request a page migration again, effectively retrying the previous page migration request. This behaves much like an in-place queuing mechanism as an extension to the waiting request queue. If the page migration request is accepted or enqueued, the entry within the page migration tracking module is freed by marking the same entry with the page ID field match as invalid, as shown in block 39.

As has been described, the present disclosure provides a method for preserving memory affinity in a NUMA data processing system. The present invention reduces and sometimes eliminates memory affinity loss due to process migration by restoring the proper memory affinity through dynamic page migration. The memory affinity access patterns of individual pages are tracked continuously. If a particular page is found almost always to be accessed from a particular remote access affinity domain for a certain number of times, and without any intervening requests from other access affinity domain, the page will migrate to that particular remote affinity domain so that the subsequent memory access becomes local memory access. As a result, the proper pages are migrated to increase memory affinity.

It is also important to note that although the present invention has been described in the context of a fully functional computer system, those skilled in the art will appreciate that the mechanisms of the present invention are capable of being distributed as a program product in a variety of recordable type media such as compact discs and digital video discs.

While the disclosure has been particularly shown and described with reference to a preferred embodiment, it will be understood by those skilled in the art that various changes in form and detail may be made therein without departing from the spirit and scope of the disclosure.

What is claimed is:

1. A non-transitory computer readable device having a computer program product for preserving memory affinity in a non-uniform memory access data processing system, said non-transitory computer readable device comprising:
   program code for, in response to a request for memory access to a page within a first memory affinity domain, determining whether or not said request is initiated by a remote processor associated with a second memory affinity domain;
   program code for, in response to a determination that said request is initiated by a remote processor associated with a second memory affinity domain, determining whether or not a page migration tracking module associated with said first memory affinity domain includes an entry for said remote processor;
   program code for, in response to a determination that said first page migration tracking module includes an entry for said remote processor, incrementing an access counter associated with said entry within said page migration tracking module;
   program code for determining whether or not there is a page ID match with an entry within said page migration tracking module:
   program code for, in response to a determination that there is no page ID match with any entry within said page migration tracking module, selecting an entry within said page migration tracking module and providing said entry with a new page ID and a new memory affinity ID;
   program code for, in response to the determination that there is a page ID match with an entry within said page migration tracking module, determining whether or not there is a memory affinity ID match with said entry having the page ID field match;
   program code for in response to a determination that there is no memory affinity ID match, updating said entry with the page ID field match with a new memory affinity ID;
   program code for, in response to a determination that there is a memory affinity ID match, incrementing an access counter of said entry having the page ID field match;
   program code for determining whether or not said access counter has reached a predetermined threshold; and
   program code for, in response to a determination that said access counter has reached a predetermined threshold, migrating said page from said first memory affinity domain to said second memory affinity domain.

2. The non-transitory computer readable device of claim 1, wherein said non-transitory computer readable device further includes program code for serving said request in a response to a determination that said request is not initiated by a remote processor associated with a second memory affinity domain.

3. The non-transitory computer readable device of claim 1, wherein an entry within said memory affinity tracking module includes a real page ID field, a memory affinity ID field, and an access counter field.

4. The non-transitory computer readable device of claim 1, wherein said non-transitory computer readable device further includes program code for alerting an operating system a page needs to be migrated to said second memory affinity domain.

5. The non-transitory computer readable device of claim 1, wherein each of said memory affinity domains is defined as a group of memories that are in physical proximity, wherein any access to a memory within each of said memory affinity domains experiences identical memory access latency.

6. The non-transitory computer readable device of claim 1, wherein each memory affinity domain is associated within a page migration tracking module.

\* \* \* \* \*